(12) United States Patent
Kimura (10) Patent No.: US 8,369,685 B2
(45) Date of Patent: Feb. 5, 2013

(54) CONTROL DEVICE, TELEVISION VIEWING SYSTEM, INFORMATION EQUIPMENT, CONTROL METHOD AND MEDIUM

(75) Inventor: Yoji Kimura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 636 days.

(21) Appl. No.: 12/471,639

(22) Filed: May 26, 2009

(65) Prior Publication Data

US 2009/0232474 A1 Sep. 17, 2009

Related U.S. Application Data (63) Continuation of application No. PCT/JP2006/325052, filed on Dec. 15, 2006.

(51) Int. Cl.
*H04N 9/80* (2006.01)

(52) U.S. Cl. .................................................. 386/248

(58) Field of Classification Search .................. 386/239, 386/248, 292, 296
See application file for complete search history.

(56) References Cited

U.S. PATENT DOCUMENTS

| | | | |
|---|---|---|---|
| 5,734,444 A | 3/1998 | Yoshinobu | 348/731 |
| 7,646,962 B1 * | 1/2010 | Ellis et al. | 386/291 |
| 2005/0198670 A1 | 9/2005 | Nishimoto | 725/58 |

FOREIGN PATENT DOCUMENTS

| | | |
|---|---|---|
| JP | 08 1996-180504 A | 7/1996 |
| JP | 8-180504 | 7/1996 |
| JP | 2002-152652 | 5/2002 |
| JP | 2002-152652 A | 5/2002 |
| JP | 2005-252764 | 9/2005 |
| JP | 2005-252764 A | 9/2005 |
| JP | 2005-269664 | 9/2005 |
| JP | 2005-269664 A | 9/2005 |
| JP | 2005-311935 | 11/2005 |
| JP | 2005-311935 A | 11/2005 |
| JP | 2005-311935 | 11/2009 |

OTHER PUBLICATIONS

English Translation of Japan Publication 2005-311935.*
International Search Report, mailed Mar. 20, 2007, in corresponding PCT Application No. PCT/JP2006/325052 (2 pp.).
English language International Preliminary Report on Patentability, mailed Jun. 25, 2009, in corresponding PCT Application No. PCT/JP2006/325052.

* cited by examiner

*Primary Examiner* — Thai Tran
*Assistant Examiner* — William Tran
(74) *Attorney, Agent, or Firm* — Staas & Halsey LLP (57) ABSTRACT

A device has an interface to the recorder and an interface to the television receiver and can connect the recorder to the television receiver. The device detects switching from a television program being viewed to the next television program to be next received and judges whether or not the current television program being viewed at the detection is registered as a television program to be recorded. When it is judged that the current television program is registered as a television program to be recorded, the device allows the recorder to start recording the current television program. After the recording is started, the device instructs the television receiver to switch the channel being received from the current television program channel to the next television program channel selected by the switching.

8 Claims, 6 Drawing Sheets

| PROGRAM ID |
| --- |
| BROADCAST START TIME |
| BROADCAST END TIME |
| PROGRAM TITLE |
| BROADCASTING CHANNEL NUMBER |
| BROADCASTING FREQUENCY |
| BROADCASTING DAY |

CONTROL DEVICE, TELEVISION VIEWING SYSTEM, INFORMATION EQUIPMENT, CONTROL METHOD AND MEDIUM

CROSS-REFERENCE TO RELATED APPLICATION

This is a continuation of Application PCT/JP2006/325052, filed on Dec. 15, 2006, now pending, the contents of which are herein wholly incorporated by reference.

FIELD

The invention relates to a technology of a television viewing system.

BACKGROUND

In a case where a family watches a television (TV) program, a priority might be given to a request of a specified person, e.g., a child, depending on a situation in the home. For example, it might happen that when a father watches a live broadcast of a baseball game in the living room, his child comes in the living room, saying that he or she wants to watch a TV drama. In such a case, it might also happen that the child changes the channel before getting consent of the father, depending on the home (a family's situation). In this kind of home, the father is unable to watch a want-to-watch program in his taste from midway.

In preparation for such a case, the program viewed just before the change of the channel can be recorded. When changing the channel of the viewing program, however, it is troublesome for the user to give an instruction to record the program through a manual operation. Even so, if recorded all times, or if a multiplicity of programs is recorded thoughtlessly, a capacity of a recording medium, e.g., a hard disk becomes deficient because of a large storage capacity used per hour in digital broadcasting. As a result, such a situation might arise that the user can not record the program which the user really desires to record.

[Patent document 1: Japanese Patent Laid-Open Publication No. 2005-311935]

SUMMARY

It is an aspect of the embodiment to presume and record, when a channel is switched over, a program which a user really wants to watch other than a program to be received next and give the user an opportunity for viewing the recorded program in another time.

The aspect of the embodiment is a control device which controls a recording device and a television receiving system. The control device includes an interface with the recording device and an interface with the television receiving system, thereby enabling the recording device and the television receiving system to be connected. The control device detects a switchover operation to a next TV program to be received next when viewing a TV program, and determines whether or not the present TV program viewed so far is registered as a recording target program, when detecting the switchover operation.

Then, the control device starts up, when the present TV program is registered as the recording target program, a process of recording the present TV program by the recording device. Still further, the control device instructs the television receiving system to switch over a receiving channel to a channel of the next TV program indicated by the switchover operation after starting up the recording process.

The object and advantage of the embodiment will be realized and attained by means of the elements and combinations particularly pointed out in the claims. It is to be understood that both the foregoing general description and the following detailed description are exemplary and explanatory only and are not restrictive of the invention, as claimed.

DESCRIPTION OF EMBODIMENT(S)

A television viewing system according to the aspect of the embodiment will hereinafter be described with reference to the drawings. A configuration in the following is an exemplification, and the embodiment is not limited to the configuration in the following.

The television viewing system records a viewing history of a user and registers information for specifying an often-watching program which is called a "usual program" in the embodiment from the viewing history. The "usual program" represents, e.g., a program that was viewed each time for 5 min or longer as a viewing period of time and viewed three times consecutively. The phrase "viewed three times consecutively" connotes, for example, that a program broadcasted once a week is viewed throughout three weeks consecutively and that a program broadcasted every day is viewed throughout three days consecutively. Note that this condition is not limited to a condition that the viewing time for every viewing be set to 5 min or longer. Another available condition may be such that the viewing time is equal to or shorter or longer than 5 min. Moreover, this condition is not restricted to the condition "viewing three times consecutively" but may also be relaxed to "twice" or limited to "four times or more". Further, the condition "consecutive viewing" may not be set. Namely, in such a case that a viewing frequency within a predetermined period exceeds a predetermined threshold value even if there is a broadcasting day when any program is not viewed, this program may be set as the "usual program". For example, a condition is that the viewing frequency per month is set equal to or larger than 80%, and so on.

Then, if a channel is switched over while the program registered as the "usual program" is viewed, the television viewing system starts recording the "usual program". Subsequently, the television viewing system, after the recording has been started, starts receiving a switched-over target program. The recording normally continues till the "usual program" is ended.

Accordingly, the user views the program registered as the "usual program", during which the channel is to be switched over, even in such a case it follows that a content of the program broadcasted after the point of time when the switchover operation has been done is recorded.

Thus, the "usual program" is determined from the viewing history of the user, and, when the viewing of the program is interrupted due to a change of the channel, it follows that the "usual program" is to be recorded. Therefore, the program, which is desired to be really recorded, can be selected from the viewing history of the user and recorded without unnecessarily recording a multiplicity of programs. With this contrivance, even if the TV channel is abruptly switched over while the user is watching, the program assumed to be a necessary program can be recorded in a way that restrains a rise in data size of the recording target program to some extent.

<Outline of Configuration of Television Systems>

Figure 1:
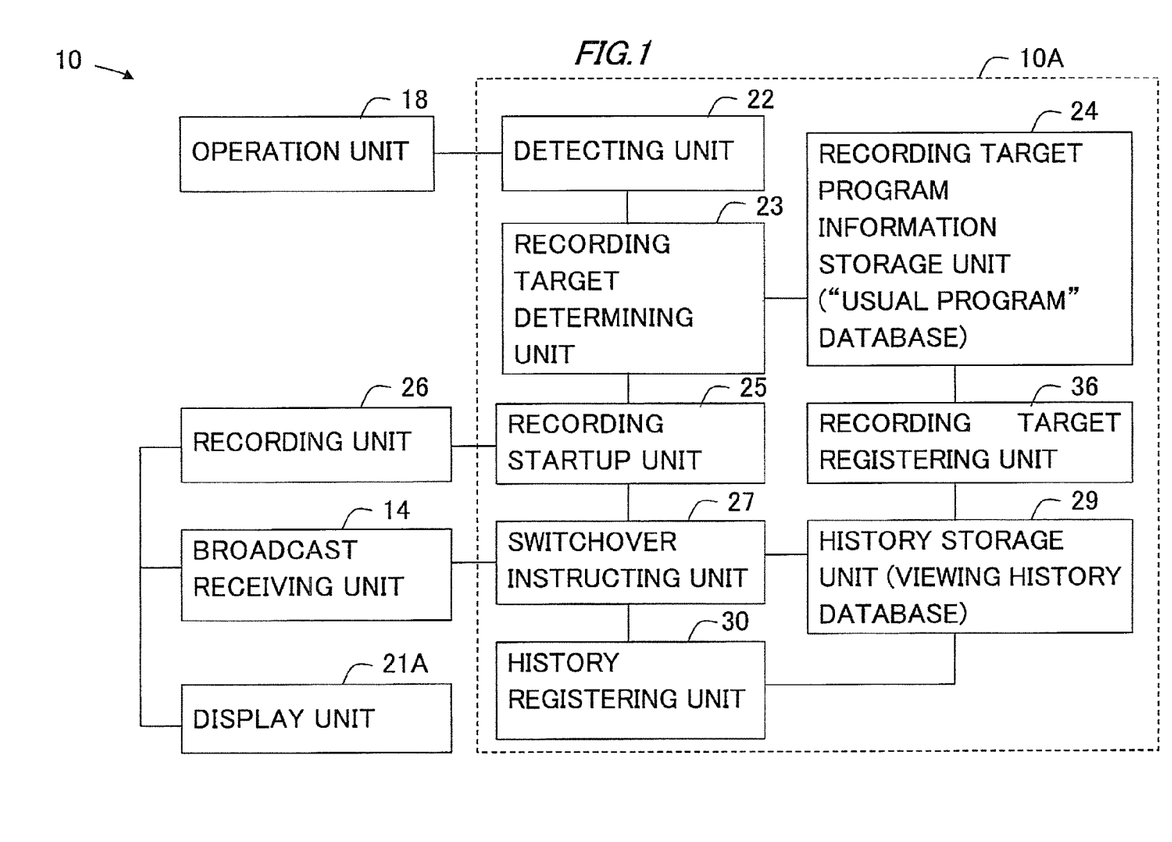
FIG. 1 is a diagram of an outline of a configuration of a television viewing system.

FIG. 1 shows a block diagram of an outline of a configuration of a television viewing system 10 according to an embodiment. The television viewing system 10 includes an operation unit 18 which operates, upon receiving a user's operation, the television viewing system 10, a recording unit 26 that records a TV broadcast according to an operation on the operation unit 18, a broadcast receiving unit 14 which receives the TV broadcast according to the operation on the operation unit 18, a display unit 21A which displays the broadcasting program recorded by the recording unit 26 or a broadcasting program received by the broadcast receiving unit 14, and a control unit 10A controlling the television viewing system 10.

Furthermore, the control unit 10A includes a detecting unit 22 which detects an operation signal generated by the user's operation on the operation unit 18, a recording target determining unit 23 that determines whether or not the program is desired to be recorded by the recording unit 26, a recording startup unit 25 which starts up, when the recording target determining unit 23 determines that the TV program is a recording target program, a recording process of recording this TV program, a switchover instructing unit 27 that indicates a broadcasting channel received by the broadcast receiving unit 14 according to the operation on the operation unit 18, a history registering unit 30 which registers the viewing history in a history storage unit 29 on the basis of the indication of the switchover instructing unit 27, the history storage unit 29 registered with the viewing history by the history registering unit 30, a recording target registering unit 36 that extracts a recording target program that is desired to be recorded from the history of the history storage unit 29, and a recording target program information storage unit 24 stored with information for specifying the recording target program by the recording target registering unit 36.

Among these components, the control unit 10A can be realized by a computer including a CPU, a memory, etc and by a program executed on the computer.

Herein, the operation unit 18 is exemplified such as a channel (channel operation unit), an operation button and an input device of a computer.

The detecting unit 22 includes an interface between the operation unit 18 and the CPU, a device driver for processing a signal of the interface and an OS (Operating System) that transmits and receives the signal to and from the operation unit 18 via the device driver, and detects the operation (e.g., the switchover of the receiving channel) via the OS.

A dedicated hardware component may, however, be provided as the detecting unit 22. For example, processes of the CPU may be shared by providing an input signal processing circuit for the operation unit. Known as this type of processing circuit are a keyboard controller, a mouse controller and so on.

Further, for instance, a dedicated input control processor for processing the signal sent from the operation unit 18 may also be separately provided. It may suffice that the input control processor converts the signal of the operation unit 18 into a predetermined channel switchover signal and transmits the signal to the recording target determining unit 23 and the switchover instructing unit 27.

The recording target program information storage unit 24 is also called a usual program database. The recording target program information storage unit 24 can be constructed as a volatile memory with a power source backed up, a nonvolatile memory such as a flash memory, or a recording medium such as a hard disk. The recording target program information storage unit 24 is stored with information for identifying the program that is watched, it is assumed, often by the user. Then, when the channel of the television viewing system 10 is switched over, a reference to the contents stored in the recording target program information storage unit 24 is made, thereby determining whether the recording is preferred to be started or not.

The recording target determining unit 23, when the detecting unit 22 detects the switchover of the receiving channel, collates a now-viewing program (i.e., the program before the switchover) with the information in the recording target program information storage unit 24. Then, when the information of the now-viewing program is stored in the recording target program information storage unit 24, it is determined that the now-viewing program is preferred to be recorded. It may suffice that the recording target determining unit 23 is configured by executing a computer program on the CPU. The recording target determining unit 23 may also include a dedicated processor which accesses the recording target program information storage unit 24, compares information of the recording target program information storage unit 24 with the now-viewing program and outputs a compared result. The dedicated processor may execute the computer program as the recording target determining unit 23.

The recording startup unit 25, when the recording target determining unit 23 determines that the now-viewing program may start being recorded, transmits an instruction containing the information specifying this program to the recording unit 26. The recording unit 26 is a recording device which records the data on the hard disk or a portable medium. It may be sufficient that the recording startup unit 25 is configured by executing a computer program on the CPU. The recording startup unit 25 may also include a dedicated processor linking up with the recording unit 26. The CPU may execute the computer program as the recording startup unit 25.

The switchover instructing unit 27, when the detecting unit 22 detects the switchover of the receiving channel and when the recording target determining unit 23 and the recording startup unit 25 completes their processes (the recording start instruction and the not-to-record determination), instructs the broadcast receiving unit 14 to switch over the receiving channel. It may be sufficient that the switchover instructing unit 27 is configured by executing a computer program on the CPU. The switchover instructing unit 27 may include a dedicated processor linking up with the recording unit 26. The dedicated processor may execute the computer program as the recording unit 26.

The broadcast receiving unit 14 is, for example, a TV tuner etc. The display unit 21A, which is a so-called TV monitor, displays the program reproduced by the recording unit 26 or the program received by the broadcast receiving unit 14, and outputs sounds.

The history registering unit 30 monitors the instruction of the switchover instructing unit 27 and determines whether or not the now-viewing program satisfies a predetermined viewing condition. The viewing condition is exemplified such as viewing continuously for 5 min or longer. Then, if the now-viewing program satisfies the predetermined viewing condition, the information specifying this program is registered in the history storage unit 29. Herein, the history storage unit 29 is what is called a viewing history database.

It may suffice that the history registering unit 30 is configured by executing a computer program on the CPU. The history registering unit 30 may include a dedicated database management processor which manages the history storage unit 29. The dedicated database management processor may execute the computer program as the history registering unit 30.

Moreover, the history storage unit 29 may include a volatile memory with a power source backed up, a nonvolatile memory such as a flash memory, or a recording medium such as a hard disk. In this case, the history storage unit 29 and the recording target program information storage unit 24 may use in different addresses on the same medium. Further, these units 29 and 24 may also use different mediums.

The recording target registering unit 26 monitors the history storage unit 29 and determines whether or not the program registered in the history storage unit 29 satisfies a predetermined history condition. The history condition is that the program was viewed several times e.g. three times consecutively, that a viewing frequency for a predetermined period exceeds a predetermined threshold value, and so forth. Then, if the now-viewing program meets the predetermined history condition, the information for specifying the program is registered in the recording target program information storage unit 24.

It may be sufficient that the recording target registering unit 26 is configured by executing a computer program on the CPU. The recording target registering unit 26 may also include a dedicated database management processor which manages the recording target program information storage unit 24. In this case, the recording target registering unit 26 and the history registering unit 30 may be constructed on the same processor. The dedicated database management processor may execute a computer program as the recording target registering unit 26.

It is noted that a configuration including the control unit 10A and the recording unit 26 corresponds to information equipment according to the embodiment. One processor may be useful instead of the dedicated processors.

<Configuration of Television Viewing System>

Figure 2:
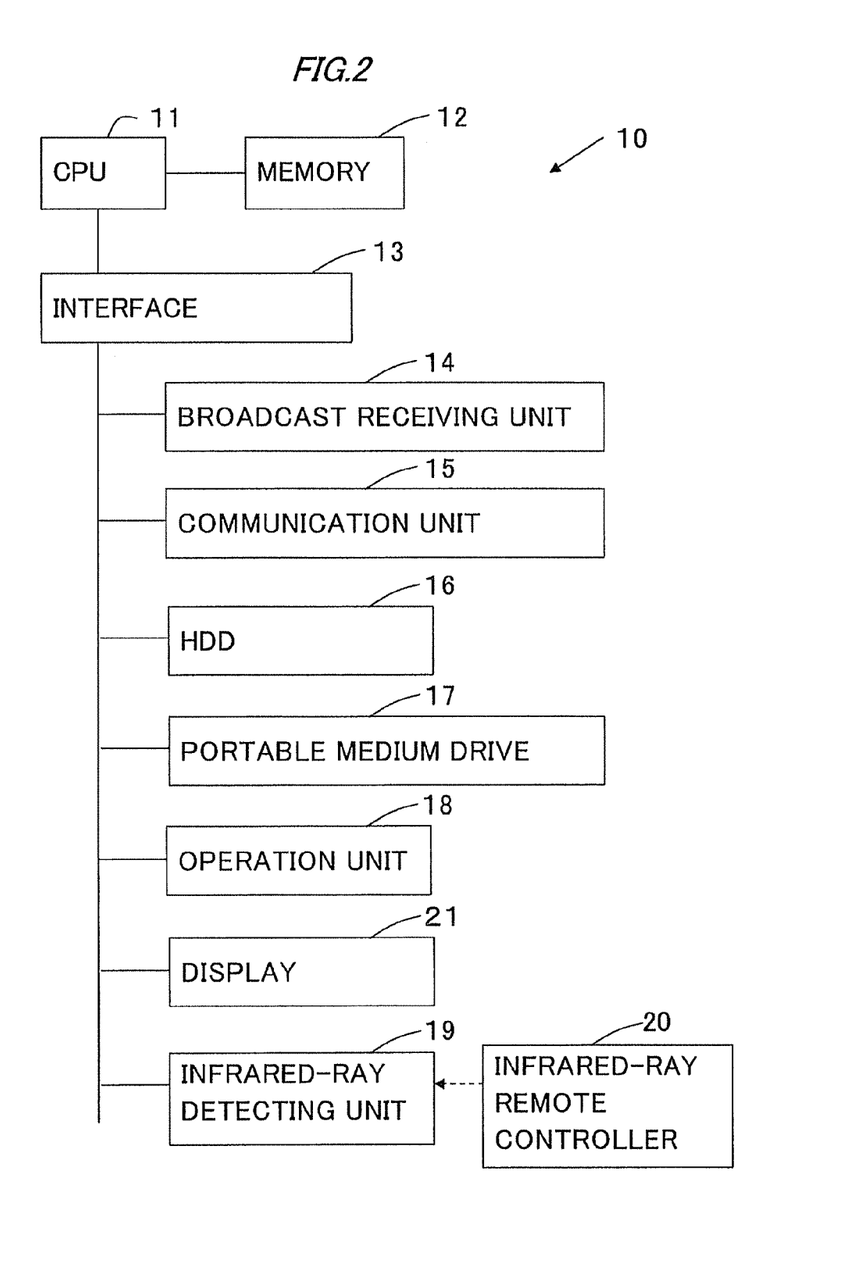
FIG. 2 is a diagram of a detailed configuration of the television viewing system.

FIG. 2 is an example of a block diagram of a detailed configuration of the television viewing system 10 according to the aspect of the embodiment. As in FIG. 2, the television viewing system 10 includes a CPU 11 executing a computer program and controlling the television viewing system 10, a memory 12 stored with the computer program executed by the CPU 11 or data processed by the CPU 11, an interface 13 which connects the CPU 11 to a variety of devices, and devices such as the broadcast receiving unit 14, a communication unit 15, a hard disk drive 16, a portable medium drive 17, the operation unit 18, the display 21 and an infrared-ray detecting unit 19, which are connected via the interface 13 to the CPU 11.

Herein, the CPU 11 executes the computer program and controls the respective units of the television viewing system 10, thereby providing the functions of the television viewing system 10. The memory 12 is stored with the program executed by the CPU 11 and the data processed by the CPU 11. The memory 12 includes a volatile RAM (Random Access Memory) and a nonvolatile ROM (Read Only Memory). The ROM includes a rewritable semiconductor memory such as a flash memory, an EPROM (Erasable Programmable Read-Only Memory) and an EEPROM (Electrically Erasable Programmable Read-Only Memory).

It may suffice that the interface 13 is any one of a serial interface such as a USB (Universal Serial Bus) and a parallel interface such as a PCI (Peripheral Component Interconnect), an ISA (Industry Standard Architecture), an EISA (Extended ISA), and ATA (AT Attachment), and IDE (Integrated Drive Electronics), IEEE1394, and an SCSI (Small Computer System Interface). Note that FIG. 2 illustrates the interface 13, however, a different interface establishes the connections between the CPU 11 and the individual devices. Further, a plurality of interfaces may also be bridge-connected.

The broadcast receiving unit 14 is, e.g., an analog TV tuner. In this case, the broadcast receiving unit 14 includes a tuning circuit and an amplifier. Moreover, the broadcast receiving unit 14 may also be what receives digital TV broadcasts. In this case, the broadcast receiving unit 14 includes, in addition to a high frequency unit including the tuning circuit and the amplifier, a digital signal decoder (e.g., a demodulator for OFDM (Orthogonal Frequency Division Multiplexing) and a decoder for MPEG-i (Moving Picture Experts Group phase i (the phase i is any one of 1, 2 and 4)). Note that the television viewing system 10 in the embodiment is not limited to the category of MPEG, and hence, in the following discussion, the decoder will be simply called the MPEG decoder.

Herein, the high frequency unit converts high frequency electromagnetic waves into baseband signals. Furthermore, the OFDM demodulator includes an FFT (Fast Fourier Transform) processing circuit and an orthogonal demodulator, and generates digital signals from the baseband signals. The MPEG decoder generates video data from the generated digital signals according to the MPEG standards. These processes may be organized by dedicated digital circuits which execute a sum-of-products operation. Further, the processes may also be organized by a processor such as a DSP (Digital Signal Processor) and a program. Moreover, an LSI for demodulation, which is manufactured based on the TV broadcasting standards and put on the market, may also be used.

In any case, the broadcast receiving unit 14 receives the TV broadcast. Note that the broadcast receiving unit 14 is, though omitted in FIG. 2, connected to an antenna or an interface with a broadband network, thus receiving ground waves, ground wave digital broadcasts, satellite broadcasts, signals from the broadband network and so forth. Then, the broadcast receiving unit 14 generates a moving picture and sounds including voices from received signals, and displays the image on the display 21.

The communication unit 15 is an interface with the broadband network. The broadband network is exemplified by a cable network such as a LAN (Local Area Network), a cable TV network, an xDSL (x Digital Subscriber Line), an ADSL (Asymmetric Digital Subscriber Line) and an optical network, or a wireless-access-enabled network such as a wireless LAN and a fixed wireless access (FWA). The communication unit 15 acquires, for example, a computer program installed into the hard disk drive 16 from the server on the network, an electronic program guide (EPG) of the TV broadcasts, a video data file recorded with the program (the moving picture and the sounds) itself to be broadcasted, or reception data of an online broadcasting program. These broadband networks can be generally connected to the Internet.

Note that when the communication unit 15 receives the broadcasting program on the broadband network, it may suffice that the reception data is transferred to the broadcast receiving unit 14. Moreover, the broadcast receiving unit 14 may also be connected to the broadband network via an interface different from the interface with the communication unit 15.

The hard disk drive 16 is stored with the program loaded into the memory 12. Further, the hard disk drive 16 saves the data processed by the CPU 11. The data contains the viewing history of the user. Accordingly, the hard disk drive 16 functions as a viewing history database under the control of the CPU 11. Moreover, the hard disk drive 16 links up with the broadcast receiving unit 14 and this records the program (the video data) of the received TV broadcast. Further, the hard disk drive 16 reproduces the recorded program and displays the image on the display 21.

It is noted, a plurality of hard disk drives 16 may be provided without being limited to the single drive. For example, the different hard disk drives 16 may be used for a disk stored with the computer program and for a disk stored with the video data file. Furthermore, for instance, the hard disk drive 16 may also be what is managed by a different computer, e.g., a disk server on the network. In this case, it may be sufficient that the CPU 11 performs communications with the disk server via the communication unit 15. Then, it may suffice that the CPU 11 displays the EPG or the video data acquired from the disk server on the display 21.

The portable medium drive 17 is a drive such as a CD (Compact Disc), a DVD (Digital Versatile Disk), a HD-DVD and a Blu-ray disc. Further, the portable medium drive 17 may also be an input/output device for a card medium having the nonvolatile memory such as the flash memory. The medium driven by the portable medium drive 17 retains, e.g., the computer program to be installed into the hard disk drive 16, the video data file, etc.

The operation unit 18 embraces a variety of switches, a knob for operating the channels, and so on. Further, the operation unit 18 includes an input device of the computer, such as a keyboard and a pointing device. A proper pointing device may, without being especially limited to the type of the pointing device, be employed corresponding to the characteristics of the television viewing system 10 and the needs of the users, the available pointing device being exemplified by a mouse, a trackball, a dial type operation unit, a stick type device for moving a pointer on the display, a device which detects a manipulation of a user's finger from an electrostatic capacity, a touch panel and a joystick.

The keyboard transmits an electric signal corresponding to the inputted key in accordance with the input operation of the user to an unillustrated keyboard controller. The keyboard controller transmits a code corresponding to the electric signal to the CPU 11. A device driver of the CPU 11 generates, based on built-in font data (containing coordinates of some points for depicting edge lines and an equation of curves that connects the points) of the OS (Operating System), the edge lines of the font (which is called a True Font) corresponding to the code, and displays the edge lines of the font on the display 21. Moreover, the CPU 11 displays and moves a character cursor representing a character input destination on the screen, corresponding to the input operation of the user.

The pointing device detects the user's operation and transmits an operation signal to an unillustrated pointing device control device (e.g., an unillustrated mouse controller or the interface 13 etc). The pointing device control device receiving the operation signal transmits information for generating a direction of the operation and a quantity of the operation to the CPU 11. The device driver of the CPU 11 displays and moves the pointer on the screen of the display 21 on the basis of the operation signals sent from the pointing device control device.

Further, the OS of the CPU 11 determines a positional relationship between the pointer and an object (a window, a button a menu, a list, etc) on the screen. Then, the object existing in a position where the pointer is located is set in a selective status or a focus status. Moreover, the selection of the object is finalized by performing a selection finalizing operation about the pointing device, e.g., by pressing the mouse button.

The display 21 is exemplified by a liquid crystal display device, a plasma display panel, a CRT (Cathode Ray Tube) and an electroluminescence panel. Note that the display 21 includes, though not illustrated, a RAM stored with the image data and a drive circuit for driving the display 21 on the basis of the data in the RAM. The RAM stored with the image data and the drive circuit for driving the display 21 may, however, be provided as image processing boards independently of the display 21. In this case, the data structuring the screen information that is given from the CPU 11 and the video data received by the broadcast receiving unit 14 are inputted to the image processing boards.

Moreover, the display 21 is attached with a loudspeaker from which to output the sounds (including the voices and the acoustic other than the voices) generated by the broadcast receiving unit 14 and the sounds including voices read from the hard disk drive 16 or the portable medium drive 17 and reproduced by an unillustrated voice synthesizing board. The voice synthesizing board converts the digital data of MP3 (MPEG Audio Layer-3) etc into the sounds.

The infrared-ray detecting unit 19 detects the operation signal through the infrared-rays from an infrared-ray remote controller 20, then converts the operation signal into the electric signal, and transmits the signal to each of the units of the television viewing system 10. Such a scheme is, however, also available that the CPU 11 temporarily accepts the operation signal via the interface 13 and sends an instruction to each of the units of the television viewing system 10. The user can operate the television viewing system 10 through the infrared-ray detecting unit 19 by operating the operation button on the infrared-ray remote controller 20.

The television viewing system 10 descried above can be constructed as a personal computer including the broadcast receiving unit 14. The television viewing system 10 may, however, without being limited to the personal computer, be other types of systems having the same function, e.g., a television receiving system including the hard disk drive 16. Moreover, the television viewing system 10 can be realized by a combination of the television receiving system and a DVD recorder, a combination of the television receiving system and a hard disk recorder, or a combination of the hard disk recorder and a television monitor (display device), a tuner for receiving the TV broadcasts and a set top box, a mobile phone with a TV broadcast receiving function, a portable information terminal (PDA: Personal Digital Assistant), a game machine, on-vehicle equipment with the TV broadcast receiving function, which has a built-in hard disk drive, and so on.

<Structure of Viewing History Database>

Figure 3:
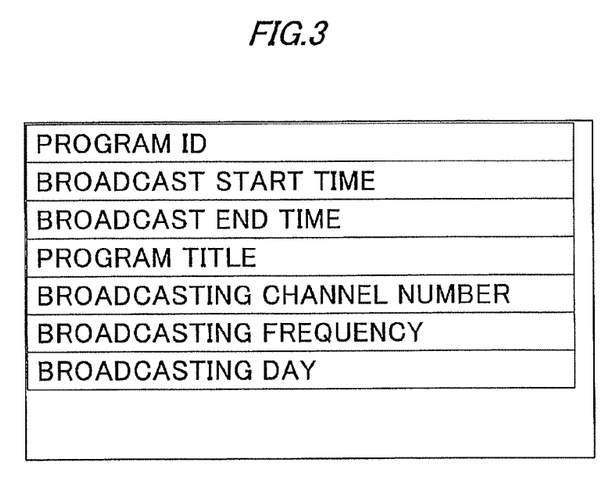
FIG. 3 is a diagram illustrating a data structure of a material (viewing) history database.

FIG. 3 shows a data structure of the viewing history database configured in the hard disk drive 16. FIG. 3 illustrates one of records in the viewing history database. As in FIG. 3, the record has respective fields such as a program ID, broadcasting start time, broadcasting end time, a program title, a broadcasting channel number, a broadcasting frequency, a broadcasting day, etc.

Herein, the program ID is an ID (Identification) from which the broadcasting station identifies each program. The program ID is, if the received broadcast is the digital broadcast, allocated to the reception data broadcasted according to the digital broadcasting standards. By contrast, if the received broadcast is the analog broadcast, according to the embodiment, the program ID field for the analog broadcast is blanked but is not used.

The broadcasting start time and the broadcasting end time are items of information for specifying a period of broadcasting time. The program title is a character string representing a name of the program. Further, the broadcasting channel number is an item of information for identifying the broadcasting channel. The broadcasting channel number may be either a character string or numeric value data. The broadcasting start time, the broadcasting end time, the program title and the broadcasting channel number can be obtained from the electronic program guide (EPG) on the network. For example, it may suffice that the CPU 11 executes a communication program based on http (HyperText Transfer Protocol), thereby obtaining the EPG from a website on a broadband network.

The broadcasting frequency is a frequency of the broadcasting channel. Further, an associative relationship between the broadcasting channel and the broadcasting frequency is stored in an unillustrated nonvolatile memory of the television viewing system 10.

The broadcasting day is information showing, e.g., every Monday, or respective days such as every Monday, every Tuesday, every Wednesday, every Thursday, every Friday and every Saturday, or everyday.

<Processing Flow>

Figure 4:
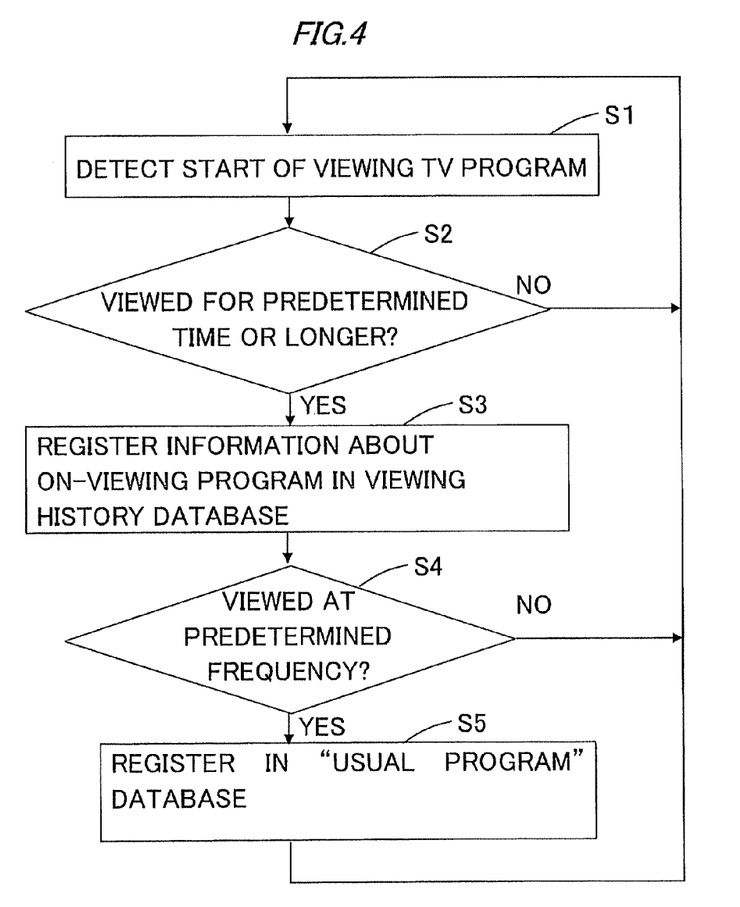
FIG. 4 is a flowchart illustrating a process of registering program information in a "usual program" data base from the viewing history database.
Figure 5:
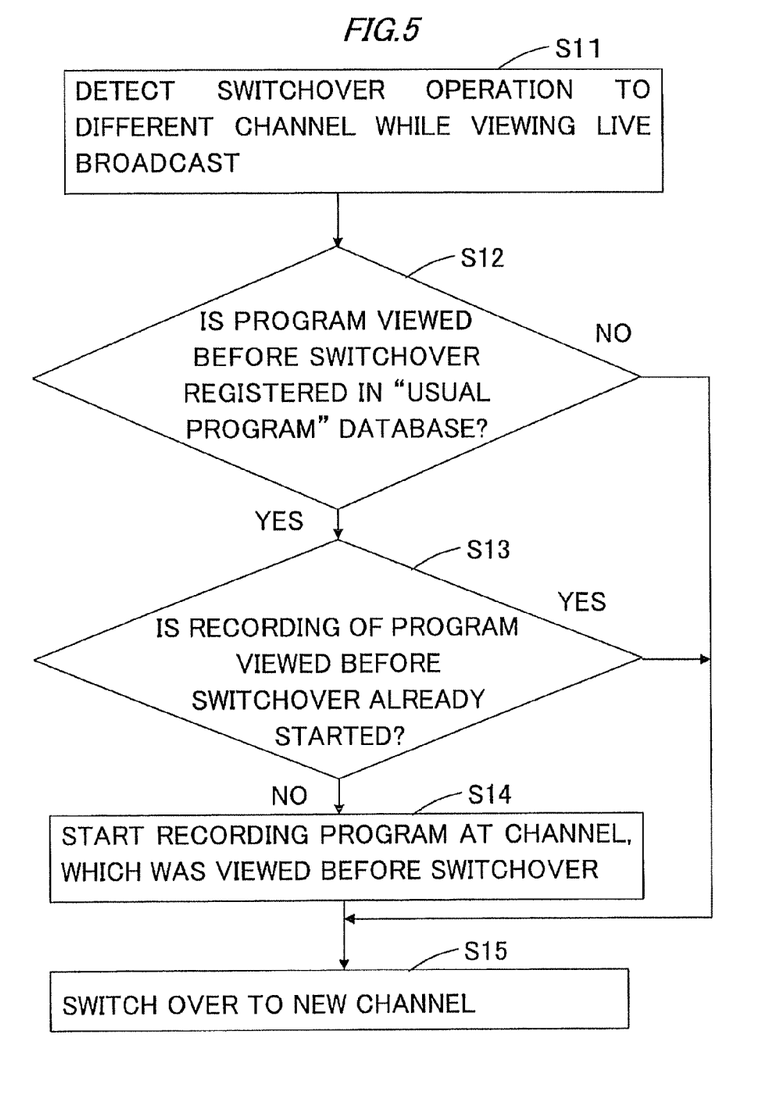
FIG. 5 is a flowchart illustrating a process when switching over a viewing program.
Figure 6:
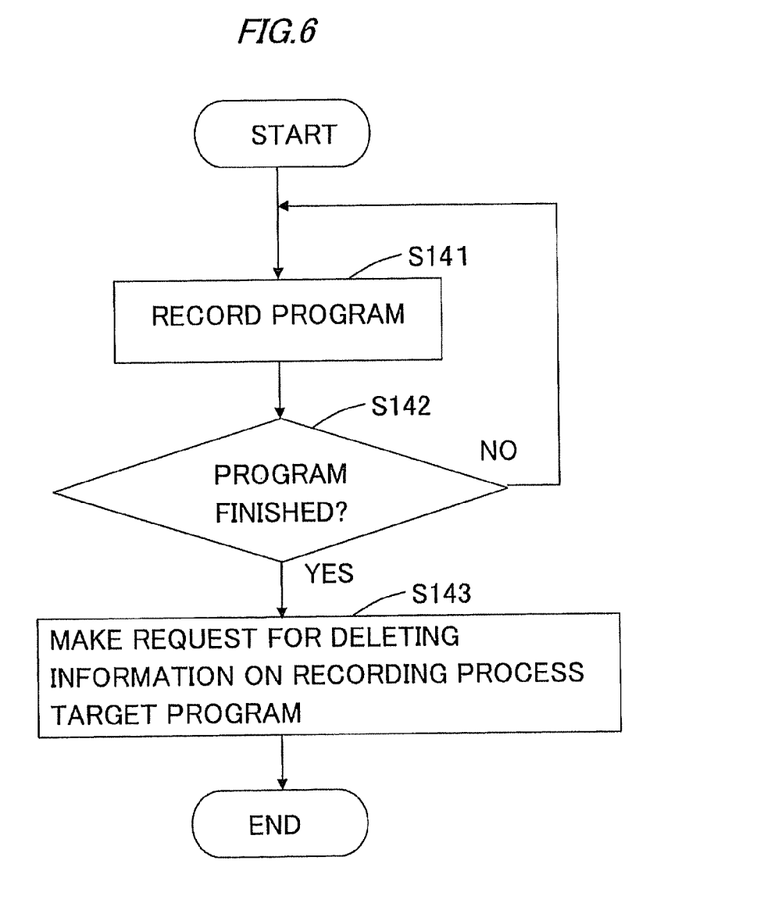
FIG. 6 is a flowchart illustrating a process of recording a "usual program".

FIGS. 4-6 show a processing flow of the television viewing system 10. FIG. 4 is a flowchart of a process of registering the "usual program". In this process, at first, the television viewing system 10 detects a start of viewing the TV program (S1). This detection may be attained in such a way that the CPU 11 detects a start of the receiving process of the broadcast receiving unit 14. The broadcast receiving unit 14, upon receiving the operation signal from the infrared-ray remote controller 20 or the predetermined instruction signal of the operation unit 18, starts the receiving process. Accordingly, the CPU 11 may detect the operation signal and/or the instruction signal such as this via the interface 13.

These operation signal and instruction signal can be acquired from a data bus identified by an address of the interface 13. Moreover, if a plurality of devices shares the bus with each other, it may be sufficient that the CPU 11 acquires the operation signal and the instruction signal in a time interval for which the bus is occupied through a time division procedure or a bus arbitration procedure between the devices sharing the bus with each other.

Moreover, the broadcast receiving unit 14, when starting the receiving process, may notify the CPU 11 of this purport in a message format via the interface 13. The message format contains at least information showing that the switchover of the channel occurs, and information about a next channel as the switchover destination.

Next, the television viewing system 10 determines whether or not the program is viewed for a predetermined period of time or longer (S2). If an interruption of viewing occurs before viewing the program for the predetermined period of time or longer, the television viewing system 10 loops back the control to S1. Herein, the case where the interruption of viewing occurs connotes, e.g., a case in which the receiving process of the broadcast receiving unit 14 is stopped by operating the operation unit 18 or the infrared-ray remote controller 20, and a case in which the receiving channel is changed. The viewing interruption such as this can be detected in the same procedure as detecting the viewing start.

While on the other hand, when determining in S2 that the program is viewed for the predetermined period of time or longer, the television viewing system 10 registers the information on the now-viewing program in the viewing history database (S3). Herein, it may suffice that the predetermined period of time is registered in, e.g., the memory 12. An initial value of a value of this period of time is a value of factory shipment and can, it may be sufficient, be set by user's operating the operation unit 18 or the infrared-ray remote controller 20. Then, the television viewing system 10 determines whether the program is viewed at a predetermined frequency or not (S4).

The predetermined frequency connotes "consecutive three weeks" about the program that is broadcasted once a week, "consecutive three days" about the program that is broadcasted everyday, and so forth. Moreover, the predetermined frequency represents a case where a ratio of a viewing count to a broadcasting count per week is equal to or larger than 0.8. A reference value of the frequency such as this may be registered in, e.g., the memory 12. An initial value of the reference value is a value of the factory shipment, and can, it may be sufficient, be set by user's operating the operation unit 18 or the infrared-ray remote controller 20.

Then, if the program is viewed at the predetermined frequency or frequency higher than the predetermined frequency, the television viewing system 10 registers this program in the "usual program" database (S5). The "usual program" database is configured on, e.g., the memory 12, and contains items of information (the program ID, the broadcasting start time, the broadcasting end time, the program title, the broadcasting channel, the broadcasting day, etc) for specifying the program shown in FIG. 3.

FIG. 5 shows a processing flow when switching over the viewing program. Herein, to begin with, the television viewing system 10 detects that a switchover instruction to a different channel is made while viewing an on-air program (which is also expressed as "when viewing a live program") (S11). This detection may be attained in such a way that the CPU 11 detects the instruction signal based on the operation on the operation unit 18 or the operation signal sent from the infrared-ray remote controller 20 via the interface 13. Further, the broadcast receiving unit 14 may also notify the CPU 11 of the switchover of the channel together with the information on the next channel as the switchover destination via the interface 13.

In this case, the television viewing system 10 determines whether or not the program viewed so far before the switchover is registered in the "usual program" database (S12). If the program viewed so far before the switchover is registered in the "usual program" database, the television viewing system 10 determines whether a process of recording the program has already been started or not (S13). This is because the already-recorded program does not need recording redundantly. Note that as for the program with its recording process being started at the present, the identifying information (refer to the record in the viewing history database in FIG. 3) of this program may be registered in the memory 12. To be specific, it may be sufficient that the CPU 11 determines whether there are coincidences or discrepancies about the program ID, the broadcasting start time, the broadcasting end time, the program title, the broadcasting channel number, the broadcasting frequency, the broadcasting day, etc between the information on the program viewed so far before the switchover and the contents registered in the memory, and thus determines whether the recording process is started or not.

Then, if the process of recording the program viewed so far before the switchover is not yet started, the television viewing system 10 gets the hard disk drive 16 or the portable medium drive 17 to start recording (S14). In this case, it may suffice that the CPU 11 transmits a recording start command to the hard disk drive 16 or the portable medium drive 17 in the predetermined message format. The message format contains at least the channel information of the "usual program".

Further, the CPU 11 registers, in the memory 12, the items of information for identifying the program, such as the channel information, the broadcasting start time, the broadcasting end time, the program title and the broadcasting day, etc of the program of which the recording has been started. Then, the television viewing system 10 switches over the receiving channel to the switchover destination channel and starts receiving the program (S15).

FIG. 6 shows the recording process by the hard disk drive 16 or the portable medium drive 17. A start of this recording process is triggered by the recording start process (the instruction given from the CPU 11) shown in S14 of FIG. 4. Although the process by the hard disk drive 16 will hereinafter be described, the process by the portable medium drive 17 is the same.

In this process, the hard disk drive 16 records the video data of the program received by the broadcast receiving unit 14 on the hard disk (S141). Then, the hard disk drive 16 determines whether the program is ended or not. The end of the program may be decided from, e.g., the broadcasting end time described in the EPG. Another available scheme is that the end time is contained in a recording start message sent from the CPU 11, and the CPU 11 gives the instruction. Then, if the broadcasting program is not ended, the hard disk drive 16 loops back the control to S141 and continues to record the program.

Then, the hard disk drive 16 requests, via the interface 13, the CPU 11 to delete the information on the program with the recording process being started from the memory (S143).

Thus, the hard disk drive 16 can, when the channel is switched over while viewing the "usual program", record this program.

Modified Example

FIGS. 3-6 have exemplified the instance of realizing the internal configuration (components) of the control unit 11A illustrated in FIG. 2, which includes, i.e., the detecting unit 22, the recording determining unit 23, the recording startup unit 25, the switchover instructing unit 27, the history registering unit 30, the recording target registering unit 26, etc, with the program executed by the CPU 11. In place of the configuration such as this, however, as described in the beginning of the embodiment, any one or more of the internal components of the control unit 10A may also be actualized by a processor, a hardware circuit, etc, which are different from the CPU 11. To be specific, the respective components in FIG. 2 may include different processors or digital circuits, depending on a processing capability and a throughput of the CPU 11. Even in the case of including the processors or the digital circuits other than the CPU 11, the processing procedures thereof are the same as those shown in FIGS. 4-6. Namely, the television viewing system 10 in the embodiment can be realized by way of the CPU 11 executing the program, or by the dedicated processors, or further by the dedicated digital circuits.

As discussed above, according to the television viewing system 10, the viewing history of the user is recorded, and the "usual program" database is registered with the information for specifying the program viewed at the frequency equal to or higher than the predetermined viewing frequency from the viewing history.

Then, if the channel is switched over while viewing the program registered in the "usual program" database, the video data defined as the contents of the program is recorded on the hard disk, the portable medium, etc. Accordingly, the user is, even when the channel of the on-viewing program is abruptly switched over, enabled to save the program and to view this program afterward.

In this case, the recording target programs are only the programs registered in the "usual program" database, and hence there is no need for unnecessarily saving a large quantity of video data.

<Others>

According to the embodiment, in such a case that the TV program is registered as the recording target program, even if the receiving channel is switched over to a different program when viewing the present TV program, the TV program can be recorded.

Moreover, according to the embodiment, it may be determined whether or not a receiving state of the on-receiving TV program satisfies a predetermined viewing condition, and a reception history of the TV program satisfying the viewing condition may be recorded. Further, according to the embodiment, a TV program satisfying a predetermined history condition among the TV programs of which the reception histories are recorded in the history storage unit, may be recorded as the recording target program.

According to the embodiment, among the TV programs, a program satisfying the predetermined viewing condition and the predetermined history condition is registered as the recording target program. It is therefore feasible to select the program which is desirable to be recorded, from the user's viewing history without through the operation by the user.

According to an aspect of the embodiment, it is possible to presume and record, when the channel is switched over, the program which the user really wants to watch and give the user the opportunity for viewing the recorded program in another time.

<Readable-by-Computer Recording Medium>

A program for making a computer, other machines and devices (which will hereinafter be referred to as the computer etc) realize any one of the functions can be recorded on a recording medium readable by the computer etc. Then, the computer etc is made to read and execute the program on this recording medium, whereby the function thereof can be provided.

Herein, the recording medium readable by the computer etc connotes a recording medium capable of storing information such as data and programs electrically, magnetically, optically, mechanically or by chemical action, which can be read from the computer etc. Among these recording mediums, for example, a flexible disc, a magneto-optic disc, a CD-ROM, a CD-R/W, Blu-ray Disc, a DVD, a DAT, an 8 mm tape, a memory card, etc are given as those removable from the computer.

Further, a hard disc, a ROM (Read-Only Memory), etc are given as the recording mediums fixed within the computer etc.

All example and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has (have) been described in detail, it should be understood that the various changes, substitutions, and alterations could be made hereto without departing from the spirit and scope of the invention.

What is claimed is:

1. A control device which controls a recording device and a television receiving system, comprising:
   an interface to be interfaced with the recording device;
   an interface to be interfaced with the television receiving system;
   a recording target registering unit to register a TV program as a recording target program;
   a detecting unit that detects a switchover operation to a next TV program to be received next when viewing a present TV program;
   a recording target determining unit that determines whether or not the present TV program viewed so far has been already registered as the recording target program by the recording target registering unit, when detecting the switchover operation;
   a recording startup unit that starts up, when the present TV program has been already registered as the recording target program, a process of recording the present TV program by the recording device; and
   a switchover instructing unit instructing the television receiving system to switch over a receiving channel to a channel of the next TV program indicated by the switchover operation after starting up the recording process.

2. The control device according to claim 1, further comprising:
   a receiving state determining unit that determines whether or not a receiving state of the present TV program satisfies a predetermined viewing condition; and
   a history storage unit that records a reception history of the present TV program satisfying the viewing condition;
   wherein the recording target registering unit records, as the recording target program, a TV program satisfying a predetermined history condition among TV programs of which the reception histories are recorded in the history storage unit.

3. A television viewing system enabling a recording device to be connected, comprising:
   a registering unit to register a TV program as a recording target program;
   a detecting unit that detects a switchover operation to a next TV program to be received next when viewing a present TV program;
   a recording target determining unit that determines whether or not the present TV program viewed so far has been already registered as the recording target program by the registering unit, when detecting the switchover operation;
   a recording startup unit that starts up, when the present TV program has been already registered as the recording target program, a process of recording the present TV program by the recording device;
   a switchover control unit that switches over a receiving channel to a channel of the next TV program indicated by the switchover operation after starting up the recording process; and
   an interface enabling a display device to be connected, wherein the display device displays a TV program of the receiving channel.

4. Information equipment comprising:
   a recording device that records a TV program;
   a registering unit to register a TV program as a recording target program;
   a detecting unit that detects a switchover operation to a next TV program to be received next when viewing a present TV program;
   a recording target determining unit that determines whether or not the present TV program viewed so far has been already registered as the recording target program by the registering unit, when detecting the switchover operation;
   a recording startup unit that starts up, when the present TV program is registered as the recording target program, a process of recording the present TV program by the recording device;
   a switchover control unit that switches over a receiving channel to a channel of the next TV program indicated by the switchover operation after starting up the recording process; and
   an interface enabling a display device to be connected, wherein the display device displays a TV program of the receiving channel.

5. A control method of a computer connectable to a recording device and a television receiving system, comprising:
   registering a TV program as a recording target program;
   detecting a switchover operation to a next TV program to be received next when viewing a present TV program;
   determining whether or not the present TV program viewed so far has been already registered as the recording target program, when detecting the switchover operation;
   starting up, when the present TV program is registered as the recording target program, a process of recording the present TV program by the recording device; and
   instructing the television receiving system to switch over a receiving channel to a channel of the next TV program indicated by the switchover operation after starting up the recording process.

6. The control method according to claim 5 further comprising:
   determining whether or not a receiving state of the present TV program satisfies a predetermined viewing condition; and
   recording a reception history of the present TV program satisfying the viewing condition;
   wherein the registering includes recording, as the recording target program, a TV program satisfying a predetermined history condition among TV programs of which the reception histories are recorded.

7. A non-transitory storage medium readable by a machine tangible embodying a program of instructions executable by the machine connectable to a recording device and a television receiving system, to make the machine execute:

registering a TV program as a recording target program;

detecting a switchover operation to a next TV program to be received next when viewing a present TV program;

determining whether or not the present TV program viewed so far has been already registered as the recording target program, when detecting the switchover operation;

starting up, when the present TV program is registered as the recording target program, a process of recording the present TV program by the recording device; and instructing the television receiving system to switch over a receiving channel to a channel of the next TV program indicated by the switchover operation after starting up the recording process.

8. The non-transitory storage medium readable by a machine tangible embodying a program according to claim 7, that makes the machine further execute:

determining whether or not a receiving state of the present TV program satisfies a predetermined viewing condition; and recording a reception history of the present TV program satisfying the viewing condition;

wherein the registering includes recording, as the recording target program, a TV program satisfying a predetermined history condition among TV programs of which the reception histories are recorded.

* * * * *